United States Patent

[11] 3,626,115

[72] Inventor Yoshimi Watanabe
Tokyo, Japan
[21] Appl. No. 820,133
[22] Filed Apr. 29, 1969
[45] Patented Dec. 7, 1971
[73] Assignee Sony Corporation
Tokyo, Japan
[32] Priority May 9, 1968
[33] Japan
[31] 43/30528

[54] TRACKING SYSTEM FOR A VIDEO RECORDER USING AN AUXILIARY DC MOTOR COUPLED TO THE CAPSTAN

1 Claim, 3 Drawing Figs.

[52] U.S. Cl. 179/100.2 S, 178/6.6 P, 179/100.2 T
[51] Int. Cl. G11b 15/52, G11b 5/52, M04n 5/78
[50] Field of Search 178/6.6 P; 179/100.2 S, 100.2 T

[56] References Cited

UNITED STATES PATENTS 3,005,056 10/1961 Goldmark et al. 178/6.6
3,431,353 3/1969 Kihara et al. 179/100.2 T

*Primary Examiner*—Terrell W. Fears
*Assistant Examiner*—Robert S. Tupper
*Attorneys*—Albert C. Johnston, Robert E. Isner, Lewis H. Eslinger and Alvin Sinderbrand ABSTRACT: A magnetic recording and reproducing apparatus for video signals which is adapted to record a video signal on a magnetic tape which is transported by a capstan and reproduce the recorded video signal by means of a rotary magnetic head device, said apparatus including a main motor common to said capstan and the rotating shaft of said rotary magnetic head device, said main motor being mechanically coupled to the rotating shaft of said rotary magnetic head device and to said capstan through an elastic belt which has a viscosity and is adapted for expansion and contraction, and an auxiliary motor mechanically coupled to said capstan, said auxiliary motor being adapted to be controlled in accordance with a phase-comparison signal obtained by phase comparing a frequency signal resulting from the rotation of the rotating shaft of said rotary magnetic head device and a control frequency signal reproduced from said magnetic tape during the reproducing operation, whereby each one field of video signal is recorded in exact correspondence to each one magnetic track and reproduced therefrom.

TRACKING SYSTEM FOR A VIDEO RECORDER USING AN AUXILIARY DC MOTOR COUPLED TO THE CAPSTAN

BACKGROUND OF THE INVENTION

Field of the Invention

This invention relates to a magnetic recording and reproducing apparatus for video signals which is adapted to record a video signal on a magnetic tape which is transported by a capstan and reproduce the recorded video signal by means of a rotary magnetic head device, and more particularly it pertains to improvements in a magnetic recording and reproducing apparatus of the type wherein the capstan and the rotating shaft of the rotary magnetic head device are rotatably coupled to each other through an elastic belt which has a viscosity and is adapted for expansion and contraction and driven by a common main motor.

Description of the Prior Art

There has heretofore been proposed a magnetic recording and reproducing apparatus of the type in which the capstan and the rotating shaft of the rotary magnetic head device are rotatably coupled to each other through an elastic belt which has a viscosity and is adapted for expansion and contraction and driven by a common main motor (refer to U.S. Pat. No. 3,431,353). The apparatus disclosed in said U.S. Pat. No. 3,431,353 is so designed that the rotating shaft of a rotary magnetic head device is always enabled to rotate at a predetermined speed by imparting a servoed brake force thereto when it tends to be rotated at a higher speed than said predetermined speed by a motor. In such apparatus, the elastic belt is made to respond to the servoed brake while being expanded. Therefore, the life span of the elastic belt is inevitably reduced, and a motor capable of producing a great torque is required. Another disadvantage is that since the servo operation is performed while imparting a brake operation to the rotating shaft of the rotary magnetic head device as described above, the servo range is relatively narrow which corresponds to the range of difference between said predetermined speed and a higher speed at which the rotating shaft of said rotary magnetic head device rotates when it is not braked.

SUMMARY OF THE INVENTION

It is an object of the present invention to provide a magnetic recording and reproducing apparatus wherein a capstan and the rotating shaft of a rotary magnetic head device which are rotatably coupled to each other through an elastic belt which has a viscosity and is adapted for expansion and contraction are driven by means of a common motor, said apparatus including a novel servosystem which make the elastic belt stand long use, thereby stably and accurately servoing the capstan or the rotating shaft of the rotary magnetic head device.

Another object of the present invention is to provide a magnetic recording and reproducing apparatus wherein a capstan and the rotating shaft of a rotary magnetic head device which are rotatably coupled to each other through an elastic belt which has a viscosity and is adapted for expansion and contraction are driven by means of a common motor, said apparatus being so designed that the capstan or the rotating shaft of said rotary magnetic head device can be accurately servoed even by the use of an inexpensive motor of not too high an accuracy and incapable of producing a great torque.

Another object of the present invention is to provide a magnetic recording and reproducing apparatus wherein a capstan and the rotating shaft of a rotary magnetic head device which are rotatably coupled to each other through an elastic belt which has a viscosity and is adapted for expansion and contraction are driven by means of a common motor, said apparatus being so designed that the capstan or the rotating shaft of the rotary magnetic head device can be servo-controlled over a relatively wide servocontrol range.

A further object of the present invention is to provide a magnetic recording and reproducing apparatus wherein a capstan and the rotating shaft of a rotary magnetic head device which are rotatably coupled to each other through an elastic belt which has a viscosity and is adapted for expansion and contraction are driven by means of a common motor, said apparatus being so designed that video signal recording tracks on a magnetic tape can be formed in a uniform pattern, thus improving the interchangeability of recorded tapes.

A still further object of the present invention is to provide a magnetic recording and reproducing apparatus wherein a capstan and the rotating shaft of a rotary magnetic head device which are rotatably coupled to each other through an elastic belt which has a viscosity and is adapted for expansion and contraction are driven by means of a common motor, said apparatus being made to be of a portable type by using a DC motor as said common motor.

Other object, features and advantages of the present invention will become apparent from the following description taken in conjunction with the accompanying drawings.

DESCRIPTION OF THE PREFERRED EMBODIMENT

Figure 1:
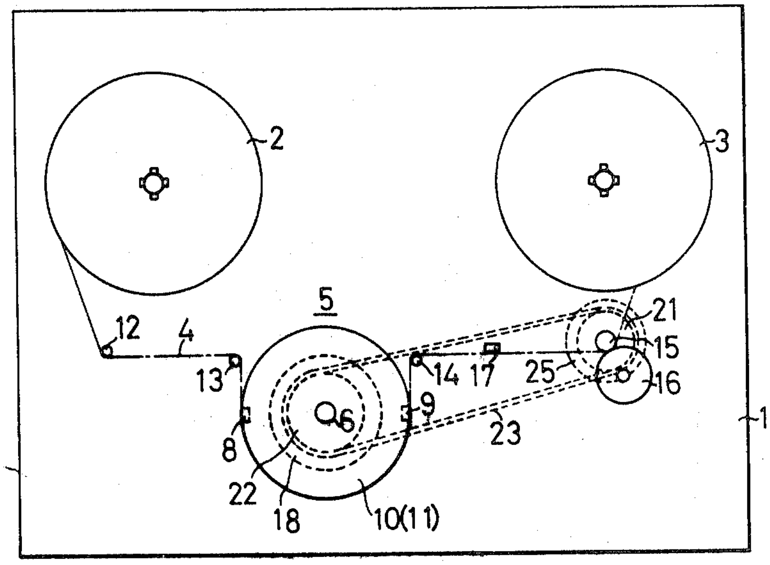
FIG. 1 is a schematic plan view showing the magnetic recording and reproducing apparatus according to an embodiment of the present invention.

An embodiment of the present invention will now be described with reference to the drawings, wherein numeral 1 represents a main baseplate on which are provided a supply reel 2 and takeup reel 3 between which a magnetic tape 4 runs. On the baseplate 1, there is also provided a rotary magnetic head device 5 along the running path for the magnetic tape 4.

In an example of the rotary magnetic head device 5, magnetic heads 8 and 9 are provided on the outer periphery of a rotary member 7 attached to a rotating shaft 6, with an angular distance of about 180° being maintained therebetween, and magnetic tape-guiding drums 10 and 11 are located at positions above and below the plane of rotation of the rotary magnetic heads 8 and 9 respectively. The magnetic tape 4 from the supply reel 2 is transported while being obliquely guided by the guide drums 10 and 11 over an angular range greater than about 180°. Numerals 12, 13 and 14 denote magnetic tape guide members respectively.

Provided between the rotary magnetic head device 5 and the takeup reel 3 are a capstan 15 and cooperating pinch roller 16 by which the magnetic tape 4 is transported in contact with the circumferential surfaces of the guide drums 10 and 11 of the rotary magnetic head device 5. Further, a fixed magnetic head 17 for control signals is provided between, for example, the rotary magnetic head device 5 and the capstan 15.

In order to rotate the rotating shaft 6 of the rotary magnetic head device 5 and the capstan, there is provided a common main motor 18 which is a DC motor for example. This motor 18 is mounted on a subbaseplate 19 provided under the main base plate 1. The rotating shaft 6 of the rotary magnetic head device 5, which extends downwardly through the baseplate 1, is coupled for example directly to the rotating shaft 20 of the motor 18.

The capstan 15 also extends downwardly through the base plate 1. A pulley 21 is mounted on the lower end portion of the capstan 15, and another pulley 22 is mounted on the rotating shaft 20 of the motor 18. An elastic belt 23 which has a viscosity and is adapted for expansion and contraction is put on these pulleys 21 and 22 in such a manner as to run therearound.

Mounted on the subbaseplate 19 is an auxiliary motor 25, which is a DC motor for example, the rotating shaft 26 of which is mechanically coupled to the lowermost end of the capstan 15 extending downwardly through the baseplate 1.

When the auxiliary motor 25 is not connected with an external electric circuit which will be described later, the rotating shaft 6 of the rotary magnetic head device 5 is rotated at a predetermined speed by the main motor 18, and the capstan 15 is also rotated at a predetermined speed through the belt 23 while rotating the rotating shaft 26 of the auxiliary motor 25. The predetermined speed of the rotating shaft 6 may be 30 c./s. which is one-second of the frequency (60 c./s.) of the vertical synchronizing signals contained in a video signal.

Mounted for example on that portion of the rotating shaft 6 which extends downwardly of the baseplate 1 are a pair of axially extending magnet pieces 27 and 28 at positions corresponding to those of the rotary magnetic heads 8 and 9 respectively. Further, a magnetic head 31 comprising a magnetic yoke 29 and a coil 30 wound thereon is mounted on a fixed portion (nor shown) in such a manner that the magnetic poles of the magnetic yoke 29 are simultaneously confronted by the magnetic pieces 27 and 28 in succession. A frequency signal which corresponds to the speed and phase of rotation of the rotating shaft 6 is available from the coil 30 of the magnetic head 31. Thus, rotation detecting means 32 is constituted by the magnet pieces 27 and 28 and magnetic head 31.

The frequency signal thus obtained is supplied to a phase comparator circuit 33 to which is also supplied a vertical synchronizing signal through a record contact R of a record-playback changeover switch 36. This vertical synchronizing signal is available from a vertical sync separator circuit 35 to which a video signal is supplied from a video signal source 34. During the recording operation, the vertical synchronizing signal available from the sync separator circuit 35 is also supplied to the magnetic head 17 for control signals through the record contact R of a changeover switch 36—amplifier 37—the record contact R of the record-playback changeover switch 38 so as to be recorded on the magnetic tape 4 along one edge thereof as control signal.

During the reproducing operation, a control signal corresponding to the vertical synchronizing signal reproduced by the magnetic head 17 for control signal is supplied to the phase comparator circuit 33 through the playback contact P of the changeover switch 38—amplifier 39—the playback contact P of the changeover switch 36.

Thus, the phase comparator circuit 33 provides a phase-comparison signal which is obtained by comparing the frequency signal resulting from the rotation of the rotating shaft 6 and the vertical synchronizing signal separated from a video signal during the recording operation or the vertical synchronizing signal reproduced by the magnetic head 17 for control signal (each of these vertical synchronizing signals will be referred to as control frequency signal hereinafter). The phase-comparison signal thus obtained is supplied to a drive control circuit 46 for the main motor 18 through the record contact R of a changeover switch 45 during the recording operation and to a drive control circuit 40 for the auxiliary motor 25 through the playback contact P of the changeover switch 45 during the reproducing operation.

If the phase of the control frequency signal leads that of the frequency available from the rotation detecting means 32, then the phase-comparison signal available from the phase comparator circuit 33 is obtained as a positive voltage, the magnitude of which decreases corresponding to the leading degree.

The drive control circuit 46 for the main motor 18 to which the phase-comparison signal is supplied during the recording operation may take any of the various conventional forms. In one example, in the case where the main motor 18 is a DC motor, a conventional rotational speed detecting means 47 which is of a noncontact type for example is provided in association with the rotating shaft 20 of the main motor 18. A frequency signal available from the rotational speed detecting means 47 is supplied to the comparator circuit 48 to which is also supplied a reference frequency signal available from a reference frequency oscillator 49. Thus, the comparator circuit 48 provides a comparison output corresponding to a change of the speed of rotation of the rotating shaft 20 from a predetermined speed of rotation, and the drive circuit 50 for the main motor 18 is controlled in accordance with the comparison output so that the rotating shaft 20 is rotated at the predetermined constant speed.

The phase-comparison signal available from the phase comparator circuit 33 is supplied to the drive circuit 50 to thereby control the latter.

During the recording operation, a video signal arriving at a terminal 34 is supplied to the magnetic heads 8 and 9 so that each field of the video signal is successively recorded in each one track on the magnetic tape 4, as in the usual case. At this point, the rotating shaft 20 is rotated in phase-synchronism with the vertical synchronizing signal contained in the video signal, so that the vertical synchronizing signal of the video signal is located at one end or the opposite ends of each magnetized track.

Figure 2:
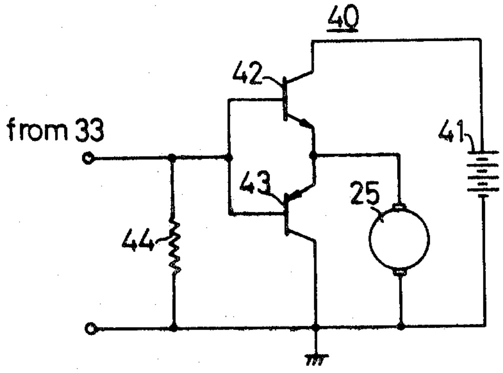
FIG. 2 is a circuit diagram showing an example of drive control circuit for an auxiliary motor.
Figure 3:
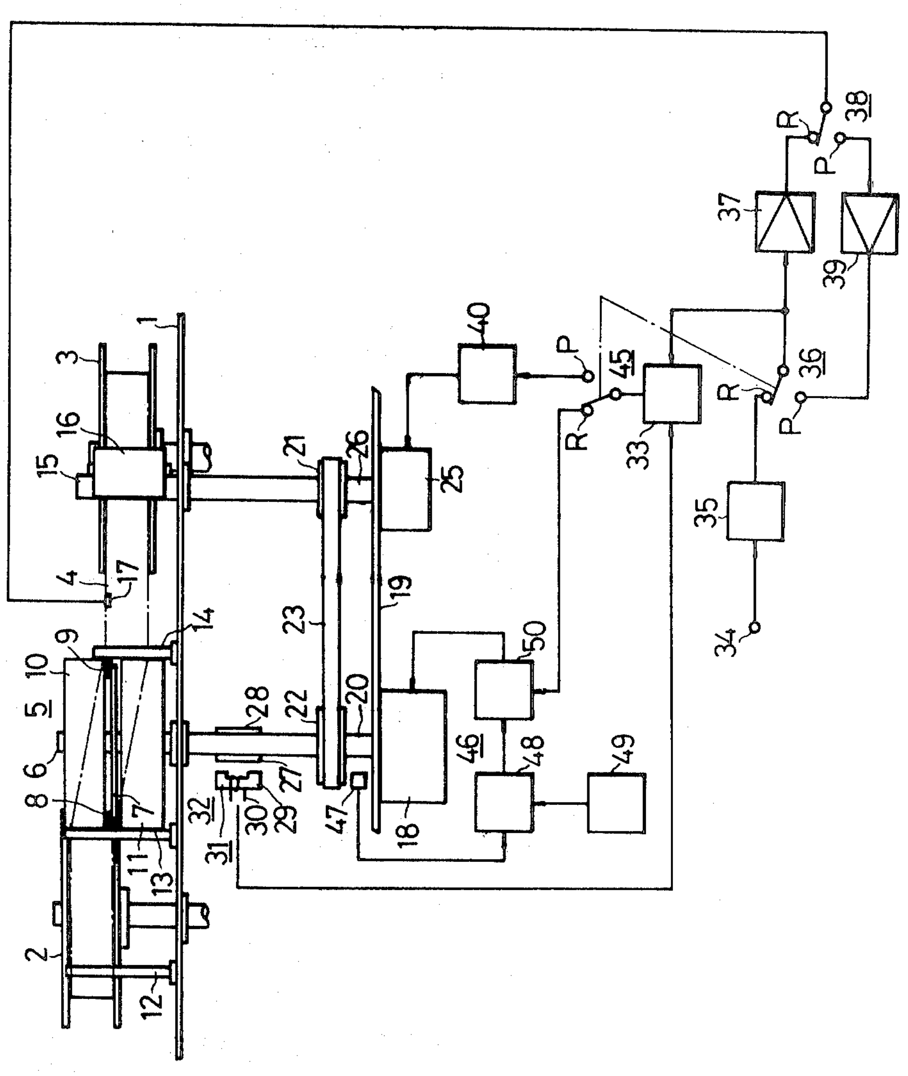
FIG. 3 is a combination of a side view showing the mechanical system of said apparatus and a block diagram of the electrical system thereof.

An example of the drive control circuit 40 for the auxiliary motor 25 to which the phase-comparison signal from the phase comparator circuit 33 is supplied during the reproducing operation is shown in FIG. 2, wherein a series circuit of the emitter-collector of an NPN-transistor 42 and the emitter-collector of a PNP-transistor 43 is connected across a power source 41, the bases of the transistors 42 and 43 being connected with each other and with one terminal of the power source through a resistor 44. The auxiliary motor 25 is connected between the emitter and the collector of the transistor 43 in parallel with the latter, and the phase-comparison signal available from the phase comparator circuit 33 is supplied across the resistor 44.

In case the phase-comparison signal voltage is lower than a predetermined level, then the transistor 43 is rendered conductive while the transistor 42 is rendered nonconductive. In such case, therefore, the auxiliary motor 25 is not driven by the power source 41, so that it is rotated with the capstan 15, with a result that a counter electromotive force is produced across the terminals of the auxiliary motor. At this point, a current resulting from this counter electromotive force flows through the transistor 43 to cause the auxiliary motor to produce a brake torque. When the phase-comparison signal voltage becomes substantially equal to the predetermined voltage, both of the transistors 43 and 42 are rendered nonconductive. Therefore no current is permitted to flow through the transistor 43, although the aforementioned counterelectromotive force is produced by the auxiliary motor 25. Thus, the auxiliary motor 25 is made to rotate idly. When the phase-comparison signal voltage goes above the predetermined level, the transistor 42 is rendered conductive while the transistor 43 is rendered nonconductive. Thus, the auxiliary motor 25 is driven by the power source 41 so as to produce a drive torque.

As described above, during the reproducing operation, the auxiliary motor 25 is caused to produce a brake torque or a drive torque or rotate idly, depending upon the phase-comparison signal voltage. Thus, since the rotating shaft 26 of the auxiliary motor 25 is coupled to the capstan 15, the latter is driven so that the phase-comparison signal voltage tends to assume the predetermined value at which the auxiliary motor is made to rotate idly, thereby always maintaining a predetermined relationship between the phase of the control frequency signal and that of the frequency signal available from the rotation detecting means 32. Thus, the rotary magnetic heads 8 and 9 are enabled to accurately scan the magnetized tracks in which the video signal is recorded, so that so-called normal tracking servo can be achieved. In this way, it is possible to accurately reproduce the recorded video signal by the rotary magnetic heads 8 and 9 during the reproducing operation.

When a brake torque is produced by the auxiliary motor 25, the belt 23 extending between the pulleys 21 and 22 has one of the side portions therebetween expanded, whereas when a drive torque is produced, it has the other side portion expanded. Therefore, even if the rotation of capstan 15 is controlled by the controlled driving of the auxiliary motor 25, the rotating shaft 6 of the rotary magnetic head device 5 is substantially not influenced.

Furthermore, since the auxiliary motor 25 is served to idly rotate, it is only when a drive or brake torque is produced by the auxiliary motor 25 that the belt 23 is expanded. That is, the belt 23 is not normally expanded. Thus, it is prevented from becoming fatigued soon, so that the servo operation can be performed stably for a long time.

The auxiliary motor 25 is served to rotate idly, and since the load as viewed from the main motor 18 to the capstan 15 side is light during the idle rotation of the auxiliary motor 25, the main motor 18 may be one which produces a relatively small torque. Also, the main motor 18 may be a cheap one of not so high an accuracy, since a servosystem therefor is constituted by the drive control circuit 46. Of course, the auxiliary motor 25 may also be a cheap one of not so high an accuracy and capable of producing only a small torque. By using DC motors as the motors 18 and 25, it is possible to obtain an inexpensive portable type magnetic video recording and reproducing apparatus.

With the drive control circuit 40 as shown in FIG. 2, even when the difference between the frequency or phase of the frequency signal available from the rotation detecting means 32 and that of the control frequency signal, namely, the mistracking extent is so great that no output is produced by the phase comparator circuit 33, the provision of the resistor 44 permits a current resulting from the counterelectromotive force produced by the auxiliary motor 25 to flow through the emitter-base of the transistor 43 and the resistor 44 to render the transistor 43 conductive so that the auxiliary motor 25 is made to produce a brake torque, whereby the predetermined relationship can be quickly achieved between the frequency or phase of the frequency signal available from the rotation detecting means 32 and that of the control frequency signal. Thus, even in such a case, normal tracking servo can be quickly achieved. This means that the servocontrol range is wide.

As described above, in accordance with the present invention, during the recording operation, each field of a video signal is accurately recorded in each one slant track successively formed on the magnetic tape 4 by the rotary magnetic heads 8 and 9, and during the reproducing operation, the magnetic heads 8 and 9 are enabled to accurately scan the magnetized tracks on the magnetic tape 4 so as to reproduce the recorded video signal.

Although, in the foregoing, description has been made of the case where the video signal appearing at the terminal 34 is derived from a television broadcast wave, it may be a video signal available from a pickup tube. In an attempt to record such video signal, the frequency signal available from the rotation detecting means 32 associated with the rotating shaft 6 of the rotary magnetic head device 5 is supplied to the pickup tube as vertical synchronizing signal. Further, a frequency signal generator (not shown) adapted to generate a horizontal frequency signal which is similar in principle to the aforementioned rotation detecting means 32 is associated with the rotating shaft 6, and the frequency signal available from this signal generator is supplied to the pickup tube as horizontal synchronizing signal. Then, the video signal available from the pickup tube is supplied to the rotary magnetic heads 8 and 9. In this case, the main motor 18 can be disconnected from the phase comparator circuit 33 of the drive control circuit 46 during the recording operation.

In the foregoing, description has been made of the case where the main motor is mechanically coupled to the rotating shaft of the rotary magnetic head device and to the capstan 15 through the elastic belt and the auxiliary motor is mechanically coupled to the capstan. However, it is also possible that the main motor is mechanically coupled to the capstan and to the rotating shaft of the rotary magnetic head device through the elastic belt and therefore that the auxiliary motor is coupled to the rotating shaft of the rotary magnetic head device. By doing so, it is possible to produce effect similar to the above, as will be apparent to those skilled in the art.

In the foregoing, a particular embodiment of the present invention has been described, but it is to be understood that the present invention is by no means limited to such particular embodiment. The present invention can be applied not only to a magnetic video recording and reproducing apparatus wherein a magnetic tape is formed with oblique recording tracks but also to a magnetic video recording and reproducing apparatus wherein recording tracks are formed widthwise of a magnetic tape, whether the video signal recorded in each one track corresponds or does not correspond to one field or one frame.

The control frequency signal which is compared with a frequency signal resulting from the rotation of the rotating shaft of the rotary magnetic head device does not have to be in agreement with the vertical synchronizing signal of a video signal in respect of frequency and phase, only if it is in synchronism with such vertical synchronizing signal.

As means for mechanically coupling the rotating shaft of the main motor to the rotating shaft of the rotary magnetic head device (in the case where the auxiliary motor is coupled to the capstan) or the capstan (in the case where the auxiliary motor is coupled to the rotating shaft of the rotary magnetic head device), use may also be made of rotary coupling means such as belt different from the expandable belt used in the foregoing embodiment and having a slight elasticity, pulleys, idlers and so forth. Rotary coupling means such as a similar belt, pulleys, idlers and the like may be used also as the means for mechanically coupling the auxiliary motor to the capstan or the rotating shaft of the rotary magnetic head device. It is also possible that the auxiliary motor and the capstan or rotating shaft of the rotary magnetic head device are disconnected from each other by the rotary coupling means between the auxiliary motor and the capstan or rotating shaft of the rotary magnetic head device only during the recording operation. By disconnecting the auxiliary motor and the capstan or rotating shaft from each other during the recording operation, the load imposed on the main motor is reduced so that the power loss of the main motor can be decreased correspondingly.

In the drive control circuit 40 as shown in FIG. 2, it is also possible that the transistor 42 is of the PNP type, and that a series circuit of the emitter-collector of the transistor 42 and the emitter-collector of the transistor 43 is connected across the power source. Alternatively, each of the transistors 42 and 43 may be substituted by a Darlington connection of two transistors of the same type. Various other modifications and changes will readily become apparent to those skilled in the art.

I claim:

1. A drive system for a magnetic recording and reproducing apparatus for video signals comprising magnetic tape drive means including a first rotary shaft and a capstan driven by said shaft, a rotary magnetic head device including a second rotary shaft and magnetic heads driven in rotation by said second shaft for selectively recording video signals on a magnetic tape driven by said capstan and reproducing the recorded video signals from said tape, and a control signal magnetic head for selectively recording a control frequency signal on said tape and reproducing the recorded control frequency signal from said tape; said drive system comprising a main motor coupled to said second shaft, an auxiliary DC motor coupled to said first shaft, pulleys on said first and second shafts, an elastic belt engaging around said pulleys so that said second shaft is rotated by said main motor and said first shaft is also rotated by said main motor by way of said pulleys and elastic belt and thereby tends to rotate at a speed in a predetermined ratio to the rotational speed of said one shaft, rotation detecting means associated with said second shaft and producing a frequency signal corresponding to the rotational speed and position of said second shaft and said magnetic heads driven thereby, phase comparator means to compare the phase of said frequency signal with the phase of said control frequency signal from said control signal head and provide a corresponding phase-comparison signal, and drive control circuit means actuated by said phase-comparison signal during reproducing of video signals from the tape to cause said auxiliary motor to rotate idly when said phase-comparison signal is at a predetermined level and to exert a braking torque and a driving torque, respectively, on said first shaft when said phase-comparison signal deviates from said predetermined level in opposite directions, and thereby ensure accurate tracking of said recorded video signals by said magnetic heads of the rotary magnetic head device, said drive control circuit means including a power source and first and second transistors, said auxiliary motor being connected with said power source through said first transistor and in parallel with said second transistor, said first and second transistors being both rendered nonconductive when said phase-comparison signal is at said predetermined level, said first and second transistors being rendered nonconductive and conductive, respectively, when said phase-comparison signal deviates from said predetermined level in one of said directions, and said first and second transistors being rendered conductive and nonconductive, respectively, when said phase-comparison signal deviates from said predetermined level in the other of said directions.

* * * * *